(12) United States Patent
John (10) Patent No.: US 10,907,672 B1
(45) Date of Patent: Feb. 2, 2021

(54) DOOR KNOB SCREW ALIGNMENT SLEEVE

(71) Applicant: Robert Kollker John, Evansville, IN (US)

(72) Inventor: Robert Kollker John, Evansville, IN (US)

( * ) Notice: Subject to any disclaimer, the term of this patent is extended or adjusted under 35 U.S.C. 154(b) by 0 days.

(21) Appl. No.: 15/932,460

(22) Filed: Feb. 28, 2018

Related U.S. Application Data (60) Provisional application No. 62/604,992, filed on Jul. 28, 2017.

(51) Int. Cl.
*F16B 5/02* (2006.01)

(52) U.S. Cl.
CPC .................... *F16B 5/0233* (2013.01)

(58) Field of Classification Search
CPC ....................................................... F16B 5/0233
USPC ........................................ 411/535, 546, 547
See application file for complete search history.

(56) References Cited

U.S. PATENT DOCUMENTS

| | | | | |
|---|---|---|---|---|
| 1,295,734 A | * | 2/1919 | Greubel | F16B 13/0808 411/38 |
| 1,419,979 A | * | 6/1922 | Ogden | F16B 13/061 411/38 |
| 1,431,176 A | * | 10/1922 | Ogden | F16B 13/06 411/38 |
| 2,324,142 A | * | 7/1943 | Eklund | F16B 19/1072 411/38 |
| 2,330,102 A | * | 9/1943 | Yarnall | G01F 23/02 73/330 |
| 2,559,281 A | * | 7/1951 | Croessant | F16B 13/061 411/38 |
| 2,762,252 A | * | 9/1956 | Karitzky | F16B 13/061 411/38 |
| 4,116,106 A | * | 9/1978 | Barbour | E04G 23/0203 248/915 |
| 4,139,246 A | * | 2/1979 | Mikoshiba | B60G 7/02 264/261 |
| 4,657,456 A | * | 4/1987 | Anquetin | F16B 13/061 411/38 |
| 4,752,168 A | * | 6/1988 | Richter | F16B 13/061 411/38 |
| 4,948,317 A | * | 8/1990 | Marinaro | F16B 43/00 220/3.7 |
| 4,986,710 A | * | 1/1991 | Kovarik | F16B 13/061 411/38 |
| 5,018,919 A | * | 5/1991 | Stephan | E21D 21/0026 411/33 |
| 5,108,243 A | * | 4/1992 | Antonucci | H02G 3/18 220/3.7 |
| 5,378,097 A | * | 1/1995 | Barnavol | F16B 37/02 411/183 |
| D386,388 S | * | 11/1997 | Antonucci | D8/354 |
| 5,725,341 A | * | 3/1998 | Hofmeister | F16B 13/061 411/258 |
| 6,719,509 B1 | * | 4/2004 | Huang | F16B 13/025 411/32 |
| 6,761,520 B1 | * | 7/2004 | Dise | F16B 33/002 411/113 |
| 6,929,424 B2 | * | 8/2005 | Hindle | E21D 21/0026 405/259.1 |
| 7,118,413 B2 | * | 10/2006 | Kidman | H01R 13/506 439/538 |

(Continued)

*Primary Examiner* — Michael McCullough (74) *Attorney, Agent, or Firm* — Barnes & Thornburg LLP (57) ABSTRACT

A flexible compressible screw guide sleeve that facilitates door knob installations.

12 Claims, 7 Drawing Sheets

(56) References Cited

U.S. PATENT DOCUMENTS

| | | | |
|---|---|---|---|
| 8,192,102 B2 * | 6/2012 | Heidari | F16B 5/0258 |
| | | | 403/2 |
| 8,602,703 B1 * | 12/2013 | Rich | F16B 13/061 |
| | | | 411/38 |
| 9,039,287 B2 * | 5/2015 | Frenznick | F16C 35/06 |
| | | | 384/551 |
| 2006/0182519 A1 * | 8/2006 | Welzel | F16B 19/02 |
| | | | 411/546 |

* cited by examiner

DOOR KNOB SCREW ALIGNMENT SLEEVE

A portion of the disclosure of this disclosure for this patent document contains material to which claims for copyrights are made. The copyright owner has no objection to the facsimile reproduction of by anyone of the patent document or the patent disclosure, as it appears in the Patent and Trademark Office Patent file or records, but reserves all other copyrights whatsoever.

CROSS REFERENCES TO RELATED APPLICATIONS

Provisional application for Patent 62/604,992 filed Jul. 28, 2017 with the same title: Door Knob Screw Alignment Sleeve which is hereby incorporated by reference. Applicant claims priority of material disclosed per 35 U.S.C.119(e)(i).

STATEMENTS AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

In the installation of door knobs on doors, many door knobs use two screws for attachment. The screws go through apertures in a base plate. The screws must line up with threaded apertures in mounting sleeves prior to securing a pair of door knobs together, in place. For most door knobs this alignment is difficult, as there is limited vision of the screws with relation to the apertures, and a source of wasted time and frustration for the door knob installer, in many instances.

This invention relates to a simple means of assisting in the process of the aforesaid alignment.

2. Background Information

In the installation of door knobs on doors, many door knobs use screws inserted through apertures in a base plate that must be lined up with threaded apertures in mounting sleeves prior to securing a pair of door knobs together, on a door. This alignment is often tedious, as there often is limited visibility of the location of the screws with respect to the apertures, and a source of wasted time and frustration for the installer of the door knob.

Often door knobs are installed on doors in new constructions, on hot days, before the air conditioning is installed.

As will be seen from the subsequent description of the preferred embodiments of the present invention, this present invention is to simplify the above named alignment.

SUMMARY OF THE INVENTION

The preferred embodiment of the present invention is the use of a flexible collapsible sleeve with a flared ends to enable the joining together of items such as, but not restricted to, door knobs.

DESCRIPTION OF THE PREFERRED EMBODIMENTS

Referring to FIGS. 1 through 7, a door knob screw alignment sleeve 100 comprises a screw boss cup 1, a screw boss guide 2, a screw guide 3, contraction members 4, contraction members junctions 5, load bearing surfaces 6, an internal alignment screw boss 7, with a screw guide stationary boss base guide load surface 7A, a stationary surface 8, and a screw guide sliding surface 9.

Figure 1:
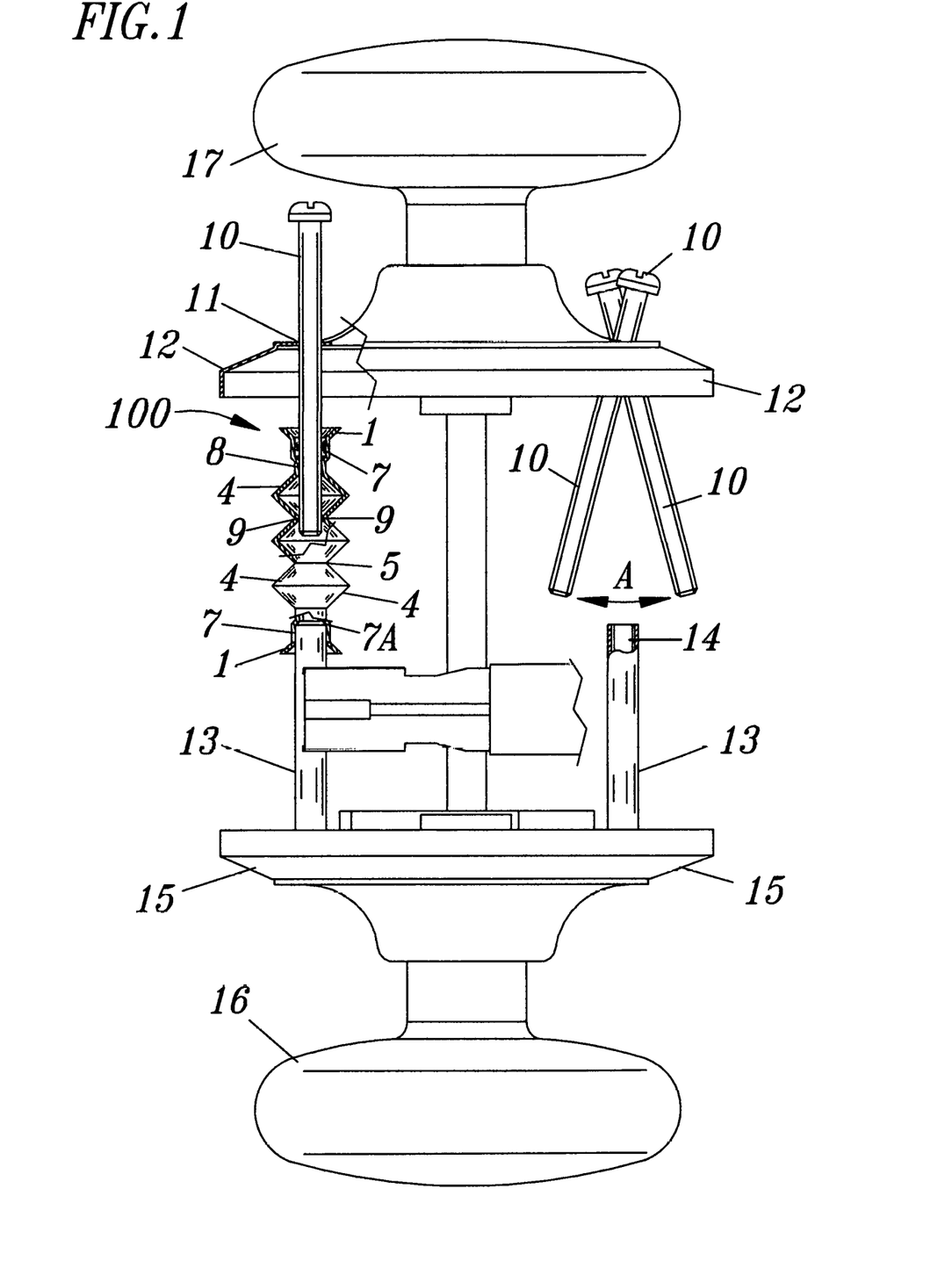
FIGS. 1 through 7 illustrate the preferred embodiment of the present invention, a door knob screw alignment sleeve.

Referring to FIG. 1, an outside door knob 17 and an inside door knob 16 are shown with only one sleeve 100 to help understand what occurs without a sleeve 100 in place during installation of door knobs 16, 17. An installer of the door knobs 16, 17 often has limited visibility of both screws 10 with respect to threaded apertures 14 in each of screw bosses 13. As screws 10, without an installed sleeve 100 can vary as indicated by the dimension A, installation of door knobs can be quite tedious and frustrating, especially during the hot sunny days which are not uncommon in construction.

Also shown in FIG. 1 is one of the two apertures 11, an inside cover plate 12 and an outside cover plate 15.

Figure 2:
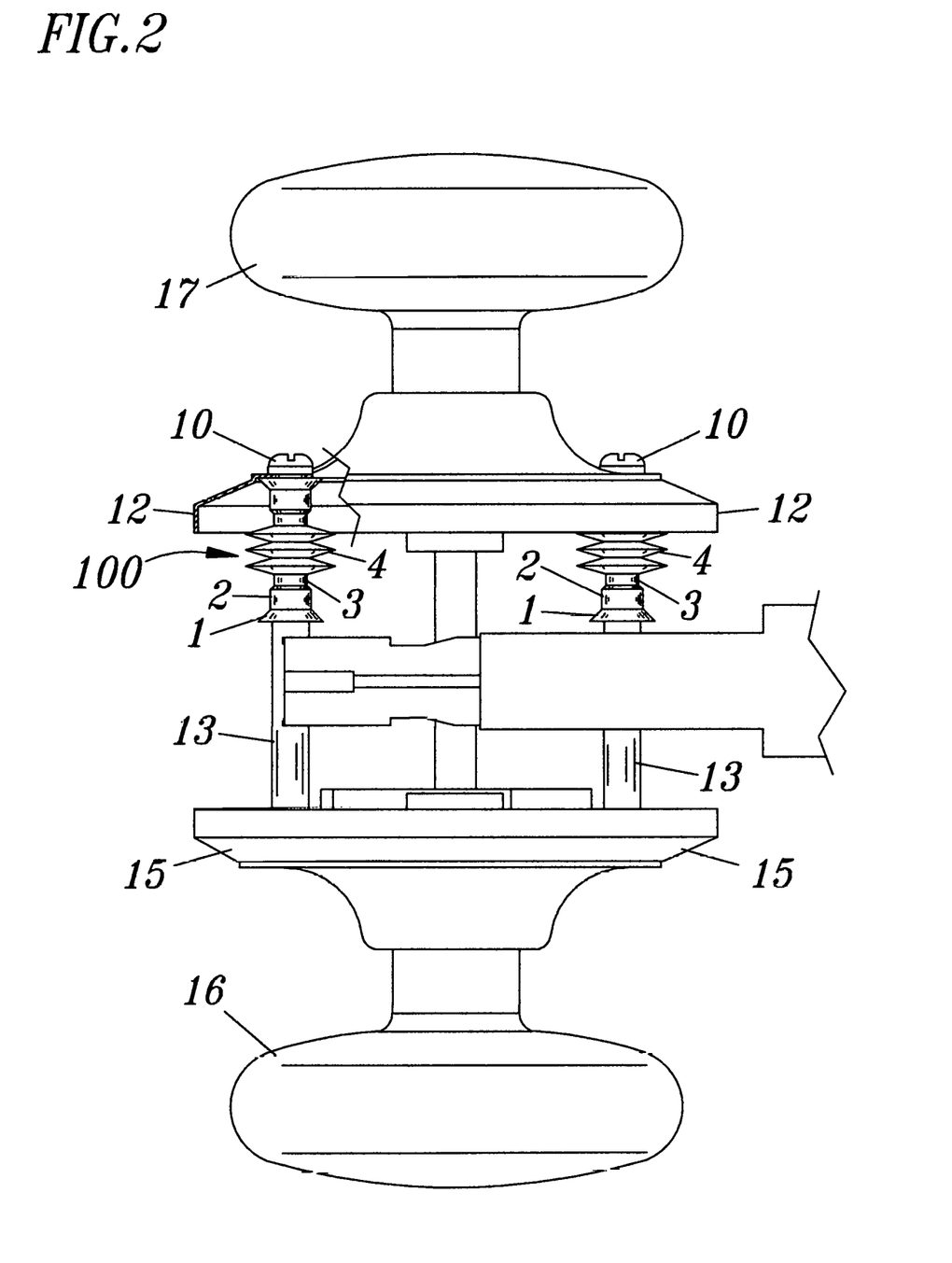
Figure 3:
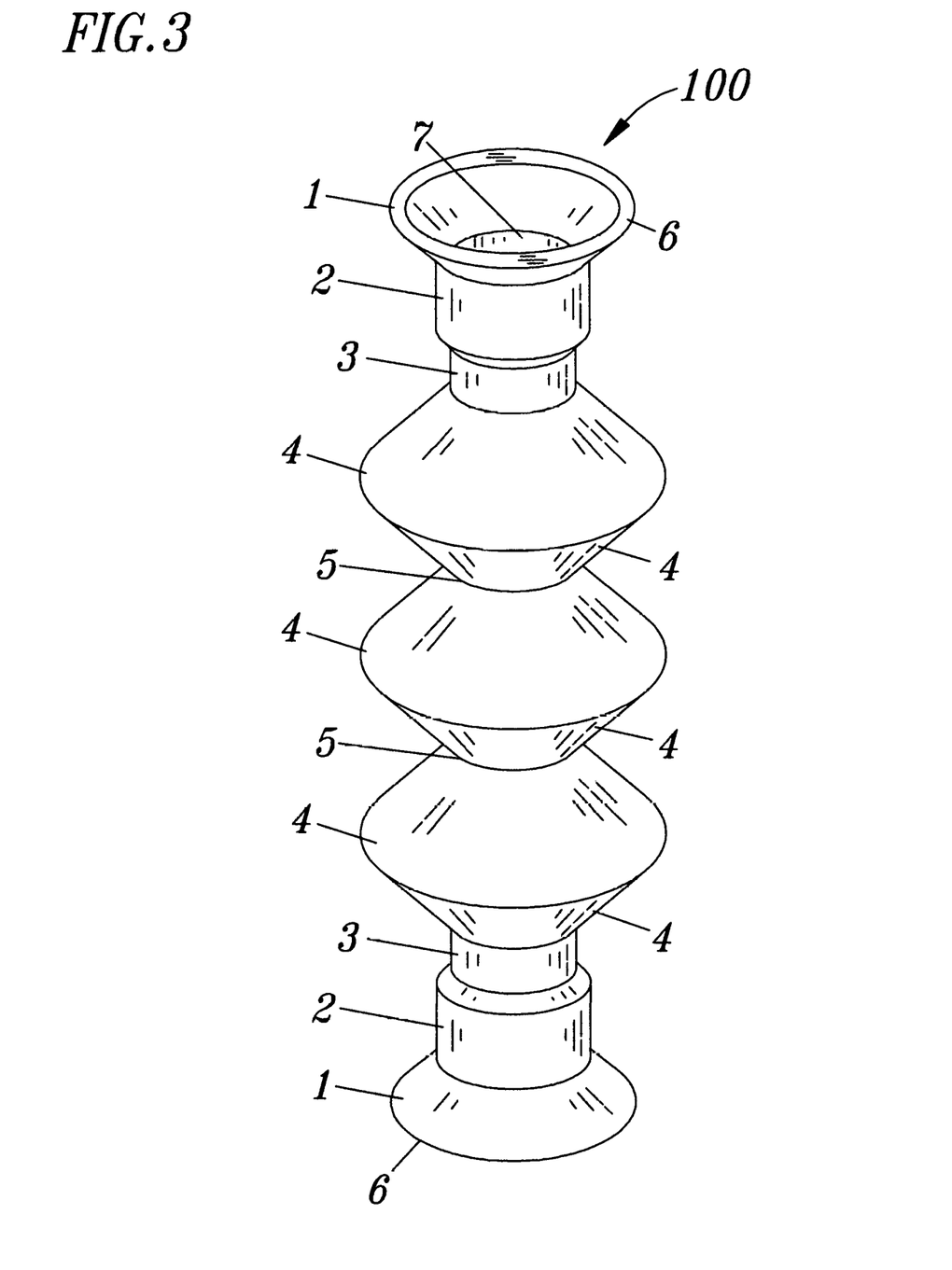
Figure 4:
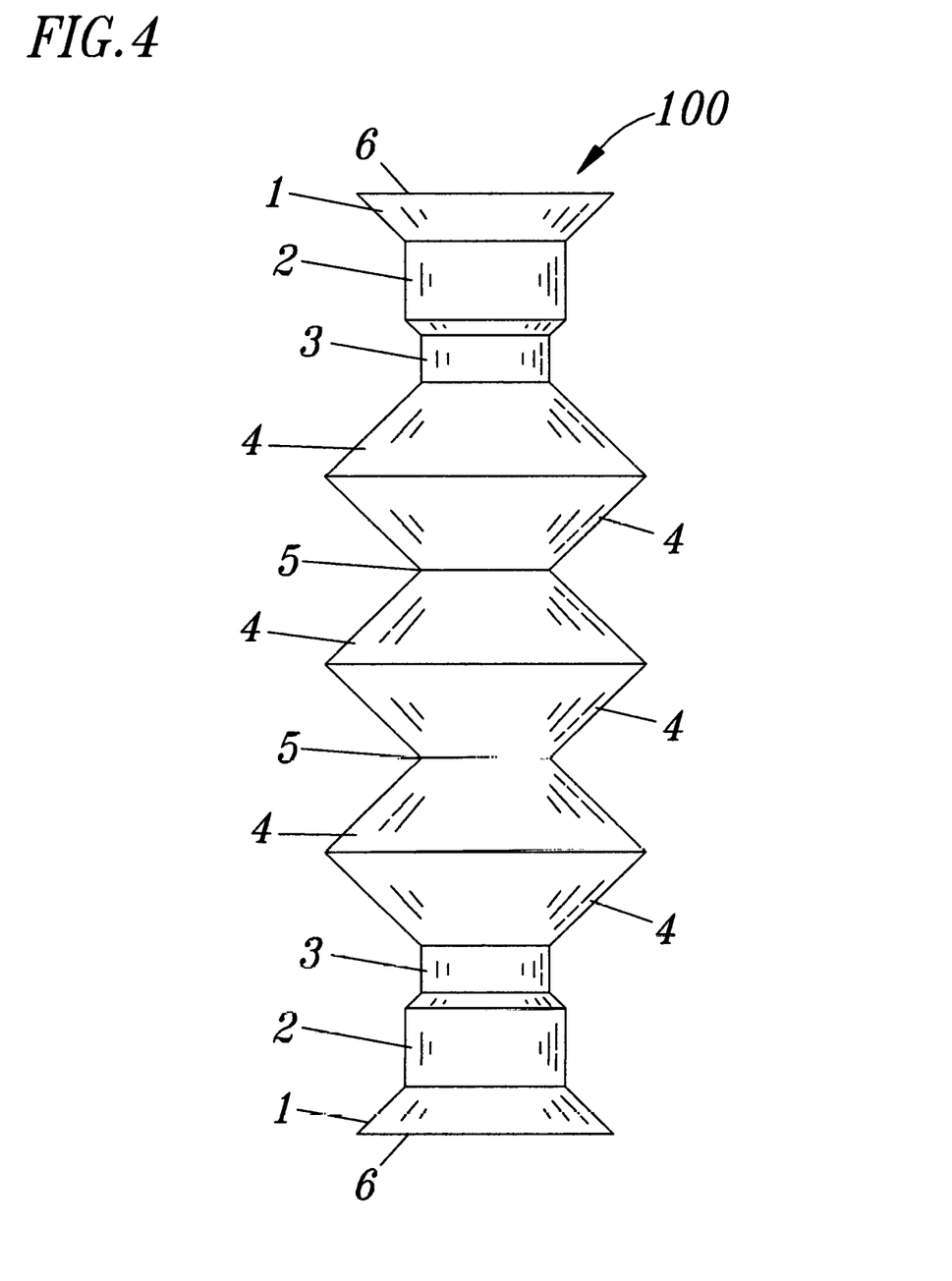
Figure 5:
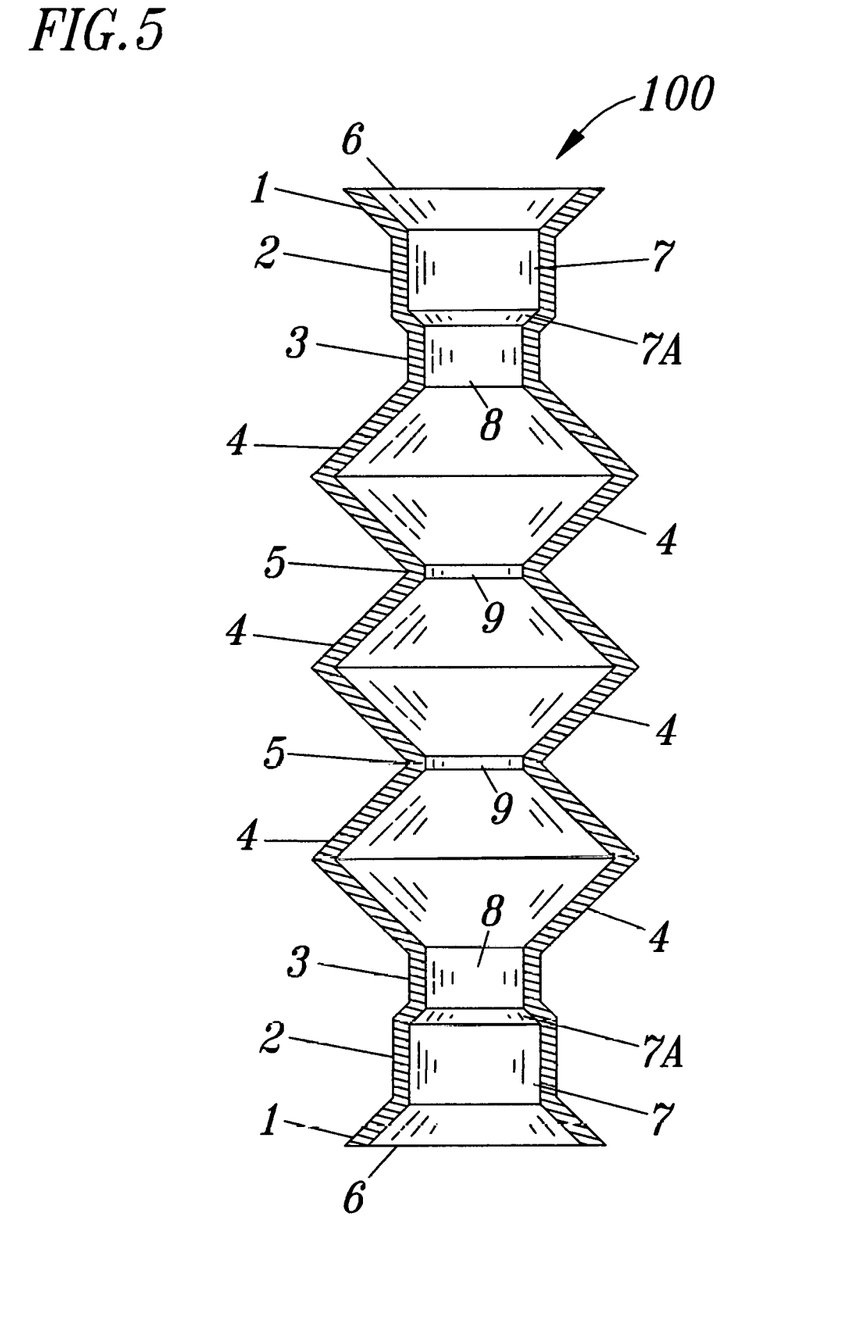

Referring to FIG. 2, the sleeve 100 is shown, as installed, compressed.

Figure 6:
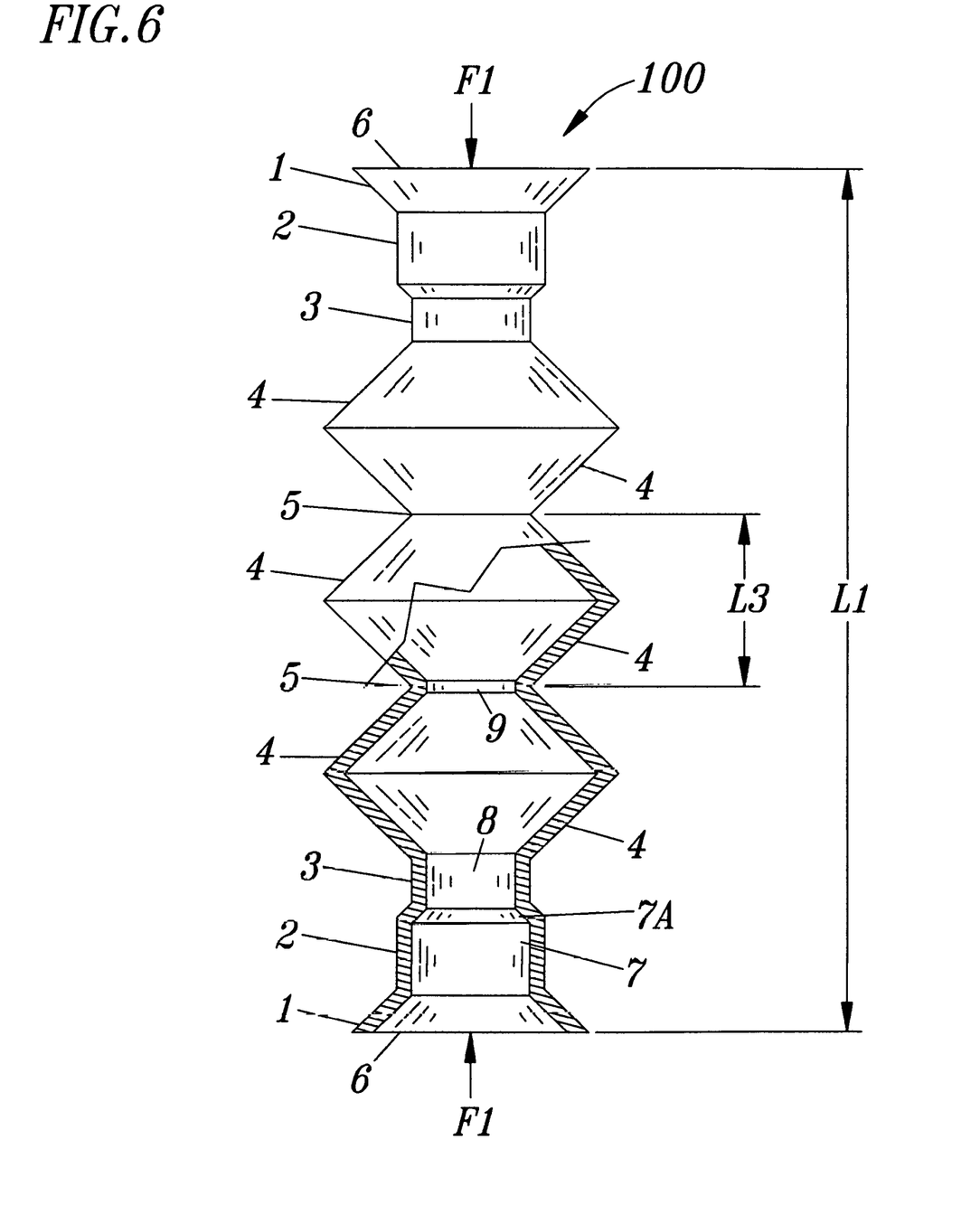

Referring to FIG. 6, a compression force direction F1 from the doorknobs 16 and 17 on the load bearing surfaces 6 is shown. Initial, uncompressed sleeve length L1 is also shown. Initial length L3 of uncompressed pairs of contraction members 4 with their respective junctions 5 is also shown.

Figure 7:
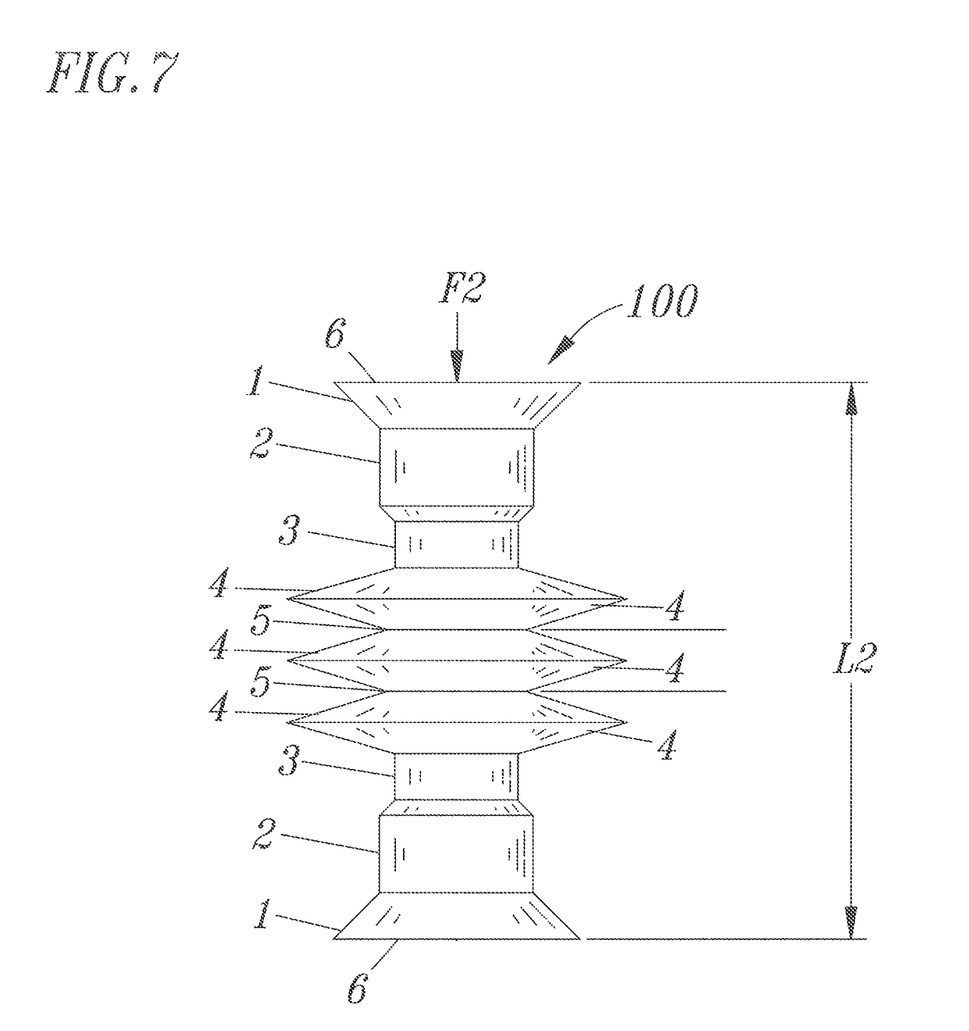

Referring to FIG. 7, a compressed sleeve length L2 from the final compression of the sleeve 100 upon completion of the assembly of the door knobs 16, 17.

Each screw 10 is tightened, securely fastening the door knobs 16, 17, together, in position. Each sleeve 100 is left in place, having served its purpose.

For purposes of enablement, in the preferred embodiment of the present invention, the sleeve 100 material is of a flexible compressible material, such as, but not restricted to an elastomer or a cross-linked polymer.

Although the descriptions above contain many specificities, these should not be construed as limiting the scope of the invention, but as merely providing illustrations of some of the preferred embodiments of the present invention.

It will be obvious to those skilled in the art that modifications may be made to the embodiments described above without departing from the scope of the present invention. Thus the scope of the invention should be determined by the appended claims in the formal application and their legal equivalents, rather than by the examples given.

I claim:
1. A screw alignment sleeve comprises:
   a first end,
   a second end, and
   a resiliently collapsible body, the resiliently collapsible body having a longitudinal length defining a longitudinal axis, a plurality of contraction members positioned along the longitudinal length, a contraction member junction positioned at the intersection of adjacent contraction members, each contraction member junction having a first diameter defining an inner diameter of a passageway through the screw alignment sleeve, wherein the first end includes a screw guide structure configured to engage a screw to align the screw along the longitudinal axis, wherein the second end includes an alignment cup configured to engage a stationary component to align the stationary component with the longitudinal axis such that the screw is aligned with the stationary component as the screw is inserted through the screw alignment sleeve and into the stationary component, and wherein the resiliently collapsible body is configured to resiliently and flexibly collapse along the longitudinal axis as the screw engages the stationary component and thereby reduce the longitudinal length of the resiliently collapsible body, the reduction in the longitudinal length causing each contraction member to be collapsed and each contraction member junction to move along the longitudinal axis as adjacent contraction members contract.

2. The screw alignment sleeve of claim 1, wherein the first end comprises a conical screw cup having a first diameter at the distal edge of the first end, the screw cup centered on the longitudinal axis and narrowing to a smaller second diameter that defines an entry to the passageway through the collapsible body.

3. The screw alignment sleeve of claim 2, wherein the alignment cup comprises a conical screw cup having a first diameter at the distal edge of the second end, the screw cup of the second end centered on the longitudinal axis and narrowing to a smaller second diameter that defines an entry to the passageway through the collapsible body.

4. The screw alignment sleeve of claim 3, wherein the collapsible body forms a bellows structure.

5. The screw alignment sleeve of claim 4, wherein the collapsible body comprises a flexibly compressible material.

6. The screw alignment sleeve of claim 5, wherein the collapsible body comprises an elastomer.

7. The screw alignment sleeve of claim 5, wherein the collapsible body comprises a cross-linked polymer.

8. The screw alignment sleeve of claim 1, wherein the collapsible body forms a bellows structure.

9. The screw alignment sleeve of claim 8, wherein the collapsible body comprises a flexibly compressible material.

10. The screw alignment sleeve of claim 9, wherein the collapsible body comprises an elastomer.

11. The screw alignment sleeve of claim 9, wherein the collapsible body comprises a cross-linked polymer.

12. The screw alignment sleeve of claim 1, wherein each contraction member includes an annular structure having two planar walls intersecting at an outer junction, the walls moving relative each other as the contraction member contracts, the outer junction providing a hinge point for the relative movement, and wherein at least one of walls engages a contraction member junction.

* * * * *